US010296637B2

(12) United States Patent
Sperling

(10) Patent No.: US 10,296,637 B2
(45) Date of Patent: May 21, 2019

(54) SYSTEM AND METHOD FOR QUERY EXPANSION USING KNOWLEDGE BASE AND STATISTICAL METHODS IN ELECTRONIC SEARCH

(71) Applicant: Stroz Friedberg, LLC, New York, NY (US)

(72) Inventor: Michael Sperling, Arlington, VA (US)

(73) Assignee: Stroz Friedberg, LLC, New York, NY (US)

( * ) Notice: Subject to any disclaimer, the term of this patent is extended or adjusted under 35 U.S.C. 154(b) by 224 days.

(21) Appl. No.: 15/244,905

(22) Filed: Aug. 23, 2016

(65) Prior Publication Data

US 2018/0060323 A1   Mar. 1, 2018

(51) Int. Cl.
*G06F 17/30* (2006.01)

(52) U.S. Cl.
CPC .............. *G06F 17/30672* (2013.01)

(58) Field of Classification Search
CPC ........... G06F 17/3053; G06F 17/30011; G06F 17/30392; G06F 17/30554
See application file for complete search history.

(56) References Cited

U.S. PATENT DOCUMENTS

| 7,483,892 B1* | 1/2009 | Sommer | G06F 17/3069 |
| 7,756,855 B2* | 7/2010 | Ismalon | G06F 17/3064 |
| | | | 707/713 |
| 8,429,184 B2* | 4/2013 | Ismalon | G06F 17/3064 |
| | | | 707/713 |
| 2007/0083506 A1* | 4/2007 | Liddell | G06F 17/2785 |
| 2008/0154886 A1* | 6/2008 | Podowski | G06F 17/30646 |
| 2010/0145975 A1* | 6/2010 | Ratiner | G06F 17/30637 |
| | | | 707/765 |
| 2012/0254161 A1* | 10/2012 | Zhang | G06F 17/30675 |
| | | | 707/723 |
| 2015/0074102 A1* | 3/2015 | Ismalon | G06F 17/3064 |
| | | | 707/734 |
| 2015/0278226 A1* | 10/2015 | Franks | G06F 17/30817 |
| | | | 707/728 |
| 2015/0294017 A1* | 10/2015 | Zhang | G06F 17/30675 |
| | | | 707/730 |
| 2015/0310115 A1* | 10/2015 | Ryger | G06F 17/30011 |
| | | | 707/708 |
| 2016/0125038 A1* | 5/2016 | Heinbockel | G06F 17/30533 |
| | | | 707/730 |

* cited by examiner

*Primary Examiner* — Daniel A Kuddus
(74) *Attorney, Agent, or Firm* — Gardella Grace P.A.

(57) ABSTRACT

Systems, devices, and methods include generating, for at least one search term of a query, a first expanded set of search terms based on at least one related term of the at least one search term obtained from a knowledge base, generating a second expanded set of search terms by applying a statistical model to the search terms of the first expanded set based on terms included in an electronic document corpus stored in an electronic data storage, and generating a third expanded set of search terms based on search terms in the first and second expanded sets. For each search term of the third expanded set, a term score is determined based on occurrence of the search term in the electronic document. The term scores are combined to create a document score for the electronic document.

22 Claims, 5 Drawing Sheets

SYSTEM AND METHOD FOR QUERY EXPANSION USING KNOWLEDGE BASE AND STATISTICAL METHODS IN ELECTRONIC SEARCH

TECHNICAL FIELD

The subject matter disclosed herein generally relates to electronic search and, more specifically, query expansion using knowledge base relations and statistical methods.

BACKGROUND

Conventional electronic searches of documents includes well-known limitations that impact speed, reliability, consumption of computing resources, and so forth. Keyword searches are a conventional mechanism for electronic search. A user enters a search term and a computing system checks various documents for that search term. However, studies have shown that searches performed using manually chosen keywords may retrieve only twenty-five percent of the relevant document population.

BRIEF DESCRIPTION OF THE DRAWINGS

Some embodiments are illustrated by way of example and not limitation in the figures of the accompanying drawings.

SUMMARY

Figure 1:
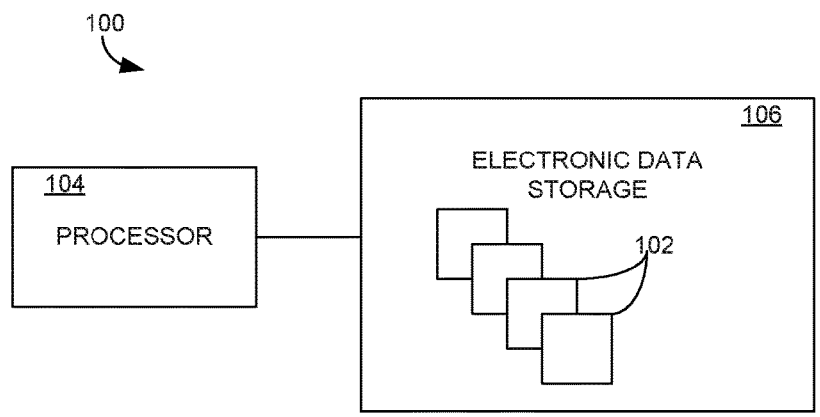
FIG. 1 is a system for searching electronic documents, in an example embodiment.

Example methods and systems are directed to electronic search and, more specifically, query expansion using knowledge base relations and statistical methods. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One problem with keyword search is that a topic of interest can often be described using many different, related terms. Some of these terms may be synonyms of primary search terms, but other necessary search terms may be related to the primary term in other ways. For example, a user may want to search a document corpus for documents about "cars". Synonyms for cars are "automobiles" and "autos", so these terms should certainly be included in the search. However, a comprehensive search may also include car manufacturers such as "Ford", "Toyota", and "Mercedes", types of cars such as "vans", "sedans", and "convertibles", and perhaps car components such as "engine" and "transmission". Knowledge bases may be utilized and updated to establish relationships between and among various terms, but knowledge bases may rely on the corpus of documents to be searched being relatively constant so that the relationships between and among terms are stable.

However, the documents in a corpus of documents to be searched may constantly be changing for a variety of reasons. Various electronic data storage devices with searchable documents may join or leave computer networks routinely, placing the corpus constantly in flux. Even relatively controlled or limited circumstances, such as in a forensic investigation of a particular device or devices, may see the corpus change as new documents or devices as discovered and added to the corpus. As such, previously set relationships may become inefficient or functionally obsolete over time.

A system has been developed which utilizes knowledge base expansion with expansion relations and a statistical model, such as Latest Semantic Indexing ("LSI"), built on a subset of a group of documents to expand the initial search terms. Using knowledge base expansion with the expansion relations, the initial terms as expanded to a set S1. Then, by expanding each term in set S1 using statistical expansion, a set S2 is obtained. The expanded query then consists of the union of sets S1 and S2.

In so doing, the system improves search results in comparison to various other systems and allows for the deletion of irrelevant or uncharacterized documents, improving the performance and efficiency of electronic data storage and reducing the performance needs of the electronic hardware. The scoring of a document in the corpus in relation to the search terms may be unrelated to scoring another document, so multiple documents can be scored in parallel with parallel processors, permitting greater overall system performance than other search mechanisms. As the corpus of documents changes, new statistical models can be created and utilized in real time.

DETAILED DESCRIPTION

FIG. 1 is a system 100 for searching electronic documents 102, in an example embodiment. The electronic documents 102 are any data files with searchable aspects. The electronic documents may include text files, spreadsheets, images, videos, audio, programs, and so forth. Electronic documents 102 individually may include a body, such as the readable text of a text file, and metadata, such as a title and other data and information about the electronic document 102 which is not itself content of the electronic document 102 for consumption by a user or program.

The system 100 includes a processor 104 and an electronic data storage 106. The system 100 may further include any of a variety of electronic equipment as desired, including one or more network interfaces and user interfaces. Further, the processor 104 and electronic data storage 106 may be individual components or implemented as multiple components across multiple devices and/or locations. Thus, the processor 104 may be multiple processors 104 coupled via a local bus or networked across multiple locations. The processors 104 may be configured to operate as a distributed system and/or in parallel, and may, in various examples, be coordinated by a master controller. Additionally or alternatively, the processor 104 may include multiple processing cores which may function as individual processors 104.

Relatedly, the electronic data storage 106 may be any electronic component which is configured or configurable to store electronic documents 102 and accessible by the processor 104. Thus, the electronic data storage 106 may be a native component to a device such as a personal computer or server which incorporates the processor 104 or may be accessible via a network interface between the processor 104 and the electronic data storage 106. The electronic data storage 106 may be any one or more of a conventional hard disk, non-volatile memory, volatile memory, cache, and so forth. The electronic data storage 106 may include data structures for the maintenance and organization of the electronic documents 102, including databases and the like. In various examples, individual electronic documents 102 may variously be incorporated within data structures or may be otherwise unorganized with respect to other electronic documents 102.

The system 100 may be implemented as any one or more devices which incorporate any one or more of the processor 104 and electronic data storage 106. Thus, the system 100 may be a single device, such as a single server, personal computer, mobile device, and the like. Additionally or alternatively, the single device may couple to a peripheral device, such as an external hard drive or network drive. Further additionally or alternatively, the system 100 may be distributed across any suitably sized network and may be located across multiple locations.

As illustrated, electronic documents 102 variously join and leave the system 100, the occurrence of which may be for any of a variety of reasons. In various examples, an electronic document 102 may individually be added via a network connection to the system 100, one or more electronic documents 102 may be incorporated because an electronic data storage 106 device such as a hard drive, non-volatile memory device such as thumb drive or memory card), optical disk, magnetic disk, and the like is either wired into the system or inserted into an appropriate reader device, or is created by a user of the system 100, e.g., by creating a new text document for editing, among any of a variety of additional reasons. Electronic documents 102 may leave the system 100 by being deleted, electronically transferred out of the system 100 via a network, or by having their native electronic data storage device 106 removed from the system 100, among any of a variety of additional reasons. The electronic data storage device 106 may further store or otherwise access a knowledge base, such as a thesaurus and the like, as disclosed herein.

Figure 2:
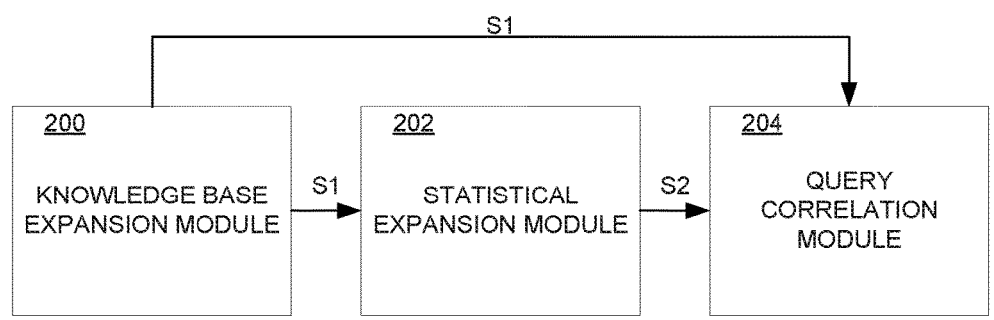
FIG. 2 is an illustration of a logical division of a system, in an example embodiment.

FIG. 2 is an illustration of a logical division of the system 100, in an example embodiment. In such an embodiment, a knowledge base expansion module 200 utilizes knowledge base expansion to expand initial search terms of a query to create a set S1 of expanded search terms. A statistical expansion module 202 utilizes one or more statistical models, such as an LSI statistical model, to expand the set S1 of expanded search terms to create a set S2 of search terms. A query correlation module 204 creates an expanded query consisting of the mathematical union of S1 and S2. The modules 200, 202, 204 may utilize or be implemented by the processor 104 or may be implemented in part by separate processors 104, separate servers, and so forth. As such, some or all of the modules 200, 202, 204 may be separate subsystems of the system 100 and may operate synchronously or asynchronously with respect to one another provided that the requisite input for each module 200, 202, 204 is available.

A query may be prose (e.g., "what is the most reliable car currently available") or disjointed individually searchable terms (e.g., "car reliability"). Thus, for instance, the disjointed individually searchable terms may be broken up directly into discrete terms T, e.g., "car" and "reliability". The prose query may be broken up into search terms T comprised of key words or phrases, ignoring words or phrases superfluous to the search itself, e.g., "most reliable", "car", "currently available", while ignoring "what is the".

The knowledge base expansion module 200 may expand the individual search terms T of a query to include related terms of T by, for instance, utilizing a thesaurus or other knowledge base to supply synonyms of the individual search terms T. The knowledge base may incorporate additional relationships besides synonyms, such as "van is a kind of car", "FORD is a manufacturer of cars" which would enable the expansions to "van" and "FORD" listed above. The knowledge base expansion module 200 may iterate the expansion, so once "FORD" is obtained, the expansion may utilize "FORD manufactures the FUSIONS" to include "FUSION" in the query expansion. However, it may be incorrect to further utilize "fusion is a kind of nuclear energy", which would go astray from the query's intent. Thus, the knowledge base expansion module 200 may follow as many of the paths as possible that contribute to the original query without following paths that will broaden the search beyond the intent of the original query.

The knowledge base may further include triples of the form (entity, relation, entity), where relation is one of a set of possible relations such as "PartOf", "RelatedTo", "DerivedFrom", and "IsA", etc., so the knowledge base may include triples such as (wheel, PartOf, car), (car, IsA, vehicle), (car, RelatedTo, automobile), (car, HasA, seat) etc. Additionally, in various examples, triples have associated weights which rank how strong the relation in the triple is. For example, triples, with weight indicated in square brackets, may include (stick, RelatedTo[0.029], car) and (stickshift, RelatedTo[1.000], car) indicating that while "stick" may be used to colloquially refer to the manual transmission of a car it may also refer to many other items, but "stick shift" is a much more specific label for a car transmission. The term "car" may also appear as the first or second term of a triple, which affects the strength and meaning of the relation. Such triples may be referred to as F for forward (term comes first) or B for backward queries (term comes second) herein. In various examples, using weights which are below a certain threshold may lead to expansions which may be too general for the purposes of the search and which may result in inefficient use of computing resources. For instance, using (stick, RelatedTo[0.029], car) to expand "car", may expand the query into areas not intended by the user. To avoid overly broad expansions and consuming resources of the system 100 unnecessarily the system 100 may require a minimum weight. The minimum weight may be absolute (e.g., 0.0005) or may be relative to another weight, such as a maximum weight (e.g., at least 0.5% of the maximum weight.

The use of relations may be chained together, but the length of the chain may be limited to preserve machine resources and to prevent the search from becoming too broad. For instance, a chain may include a primary triple or set of triples followed by a secondary triple or set of triples and a tertiary triple or set of triples and so forth, applied in sequence to search a corpus of electronic documents 102. Thus, for instance, the knowledge base expansion module 200 may expand a primary search term TP with a first relation R1 and a secondary term T2 in a primary triple (TP, R1, T2). The secondary term T2 may then be applied in a secondary triple (T2, R1, T3), and so forth. In various examples, this type of chaining may be continued indefinitely, but empirical testing has shown that a chain length of two may be optimal.

In various examples, the knowledge base expansion module 200 may reach a term by multiple paths from a primary search term, especially if relations are chained. For instance, starting from primary search term TP, secondary term TS may be reached twice using the following relations R and chaining: (TP, R1, T2), (T2, R2, TS); and (TP, R3, T3), (T3, R4, TS). In an example, if a secondary term TS is reached more than a threshold number of times from a primary search term TP by multiple paths, then the knowledge base expansion module 200 will expand the query to that secondary term TS even if the system 100 would not normally use some links in the paths due to the nature of the relations or associated weights in those links.

In various examples, the knowledge base expansion module 200 may associate a score with each relation and F/B designation, which can be used to associate a score with each expanded search term. When the knowledge base expansion module 200 uses an expanded query to search for documents, the knowledge base expansion module 200 may use the sum of the scores of the terms that are found in the electronic document 102 to score the electronic document 102 for ranking purposes. In an illustrative example, the knowledge base expansion module 200 may expand a query from search term T. A term T1 reached via the relation "IsA" may be assigned a higher score than a term T2 reached via the relation "RelatedTo". In the example provided below, the score of IsA is 8.0 and the score for RelatedTo is 2.0. In such a case, the knowledge base expansion module 200 may identify document D1 because of a match on T1 and document D2 because of a match on T2. In various examples, the knowledge base expansion module 200 then ranks D1 ahead of D2 in a results list. A term's score may also be increased by exceeding the "number of occurrences" threshold described above, for instance by multiplying the term's total score by 1.5.

While any of a variety of relations may be utilized, whether described herein with particularity or which may be developed, what follows is example set of primary and secondary relations in pseudocode which may be utilized by the knowledge base expansion module 200:

```
public List<MinRelationParams> primaryRelations = Arrays.asList(
    new MinRelationParams("IsA","B",1.0,8.0),
    new MinRelationParams("RelatedTo","B",1.0,2.0),
    new MinRelationParams("DerivedFrom","B",1,0,4.0),
    new MinRelationParams("EtymologicallyDerivedFrom","B",1.0,4.0),
    new MinRelationParams("Synonym","A",1.0,8.0)
    );
public List<MinRelationParams> secondaryRelations = Arrays.asList(
    new MinRelationParams("IsA","B",1.0,4.0),
    new MinRelationParams("RelatedTo","B",1.0,1.0),
    new MinRelationParams("DerivedFrom","B",1.0,2.0),
    new MinRelationParams("EtymologicallyDerivedFrom","B",1.0,2.0),
    new MinRelationParams("Synonym","A",1.0,4.0)
    );
```

The example relations are set for two levels of expansion in which each initial query term T is first expanded to a set S1 using the primaryRelations. Each term in S1 may then be expanded by the knowledge base expansion module 200 using the secondaryRelations. In one example set of relations, each relation is defined as a quad-tuple having: relation name; whether the relation will be used only in a forward relation (F), only in a backward relation (B), or in both F and B relations (A); the minimum weight threshold to use the relation; and the document score that will be assigned to each electronic document 102 having a term found using the relation. In an example, it may be assumed that there is a relation ("biopolitics", "Etymologically-DerivedFrom [1.0]", "politics") and a user queried on the word "politics". Then, for instance, a quad-tuple [EtymologicallyDerivedFrom,B,1.000,2.00] states that any electronic document 102 having the term "biopolitics" is assigned a score of 2.000.

It is to be recognized and understood that either or both of the knowledge base expansion module 200 and the statistical expansion module 202 may generate scores which may be utilized by the system 100 or a user of the system 100 as desired. Moreover, the mechanism for generating the scores by the knowledge base expansion module 200 and/or the statistical expansion module 202 may be utilized by the query correlation module 204 to generate the document scores which are utilized to categorize and/or rank the electronic documents 102. Thus, it is to be understood that the query correlation module 204 may utilize any suitable mechanism for scoring electronic documents 102, including those disclosed with respect to the knowledge base expansion module 200 and the statistical expansion module 202.

An example execution of the primary and secondary relations is illustrated in the following example expansions for the base search term "politics". In the example, some of the primary, or first level, expansions for "politics" include:

politics~P~biopolitics~4.0: [biopolitics,EtymologicallyDerivedFrom,B,1.000]
politics~P~boycott~8.0: [boycott,IsA,B,1.000]
politics~P~bull_session~2.0: [bull_session,RelatedTo,B,1.000]
politics~P~cast_vote~8.0: [cast_vote,IsA,B,1.000]
politics~P~cold_war~8.0: [cold_war,IsA,B,1.000]
politics~P~corporatism~2.0: [corporatism,RelatedTo,B,1.000]
politics~P~cyberpolitics~4.0: [cyberpolitics,EtymologicallyDerivedFrom,B,1.000]
politics~P~cyberpolitics~2.0: [cyberpolitics,RelatedTo,B,1.000]
politics~P~econopolitics~2.0: [econopolitics,RelatedTo,B,1.000]
politics~P~election_for_office~8.0: [election_for_office,IsA,B,1.000]
politics~P~genopolitics~4.0: [genopolitics,EtymologicallyDerivedFrom,B,1.000]
politics~P~geopolitics~4.0: [geopolitics,DerivedFrom,B,1.000]
politics~P~geopolitics~4.0: [geopolitics,EtymologicallyDerivedFrom,B,1.000]

Each line shows an expansion, the score of which may be assigned by the knowledge base expansion module 200 to the term T as a term score, and the relation which caused the expansion. For example, in the second line "politics" expands to "boycott" due to the relation "boycott IsA" politics and is assigned a score of 8.0. Continuing the example, "boycott" may be expanded by the secondary, second level relations. Some examples of the secondary relations for "boycott" may be:

boycott~S~antiboycott~2.0: [antiboycott,EtymologicallyDerivedFrom,B,1.000]
boycott~S~antiboycott~1.0: [antiboycott,RelatedTo,B1.000]
boycott~S~blackball~4.0: [blackball,Synonym,F,1.000]
boycott~S~blacklist~4.0: [blacklist,Synonym,F,1.000]
boycott~S~boycotter~2.0: [boycotter,EtymologicallyDerivedFrom,B,1.000]
boycott~S~boycotter~1.0: [boycotter,RelatedTo,B,1.000]
boycott~S~boycottism~2.0: [boycottism,EtymologicallyDerivedFrom,B,1.000]
boycott~S~counterboycott~2.0: [counterboycott,EtymologicallyDerivedFrom,B,1.000]
boycott~S~counterboycott~1.0: [counterboycott,RelatedTo,B,1.000]
boycott~S~embargo~4.0: [embargo,Synonym,F,1.000]

The above example is not exhaustive of the expansion of "politics" or "boycott", and not only may the knowledge base expansion module 200 expand "politics" by additional primary relations and "boycott" by additional secondary relations, the knowledge base expansion module 200 may also expand some or all of the primary expansions with secondary relations and the secondary expansions may be expanded by tertiary, third level relations, and so forth.

The statistical expansion module 202 may identify statistical correlations between particular words or terms within one or more of the corpus of electronic documents 102. The statistical expansion module 202 may utilize processes known in the art to identify such statistical correlations, such as LSI or random projection (RP), among other suitable statistical correlation processes known or that may be developed. In various examples, the statistical expansion module 202 utilizes query expansion to find the words that have strong statistical correlation to the original search terms and creates set S2 of individual search terms T. In the examples illustrated herein, LSI is the mechanism utilized by the statistical expansion module 202, though it is emphasized that the use of LSI in these examples is without limitation. In an illustrative example, the statistical expansion module 202 utilizes a corpus of electronic documents 102 to develop an LSI model and produces, as an illustrative example, a set S2 of search terms T (with associated correlation scores, provided for illustrative purposes) for "government" and "politics" as follows:

Added: citizen expanded from: government with score: 9.39
Added: proposal expanded from: government with score: 8.74
Added: court expanded from: government with score: 8.66
Added: law expanded from: government with score: 8.54
Added: hide expanded from: government with score: 8.49
Added: u.s. expanded from: government with score: 8.40
Added: legal expanded from: government with score: 8.33
Added: security expanded from: government with score: 8.20
Added: expand expanded from: government with score: 8.10
Added: investment expanded from: politics with score: 8.93
Added: officer expanded from: politics with score: 8.92
Added: commission expanded from: politics with score: 8.90
Added: reduction expanded from: politics with score: 8.83
Added: reduce expanded from: politics with score: 8.79
Added: meet expanded from: politics with score: 8.74

As described herein, the query correlation module 204 may utilize the union of the set S1 of terms T generated by the knowledge base expansion module 200 and the set S2 of terms T generated by the statistical expansion module 202 to create set S3. In other words, any term generated by either the knowledge base expansion module 200 or the statistical expansion module 202 is utilized by the query correlation module 204 as part of set S3 to score some or all of the electronic documents 102. Alternatively, the query correlation module 204 may place limitations on the terms T from the sets S1 and S2 that are utilized to score, categorize, and/or rank the electronic documents 102. For instance, a term may be required to have a minimum term score from the knowledge base expansion module 200 or the statistical expansion module 202 or a minimum weight for use by the query correlation module 204.

In an example, some or all of the electronic documents 102 are scored by the query correlation module 204. In various examples, for each electronic document 102, the electronic document 102 is searched for each term T in set S3. If the term $T_i$ is found in the electronic document 102, a term score for the term $T_i$ is computed for that electronic document 102. Each term score for each term T of the set S3 which is found in the electronic document 102 is then combined, e.g., by summing or otherwise utilizing a mathematical function, to create a document score for the electronic document 102.

The term score for each individual term T for an electronic document 102 may be calculated by multiplying the number of times the term T occurs in the electronic document 102 by the weight of the term T, e.g., as determined in or utilized by the knowledge base expansion module 200. Thus, for instance, for a first electronic document 102, the term score of a term T "geopolitics" which has a weight of 4.0 and which occurs five times in the first electronic document 102 may be 4.0*5=20.0. For a second electronic document 102, the term score of the term T "geopolitics" which occurs only one time in the second electronic document 102 may be 4.0*1=4.0. For a third electronic document 102 which does not include the term "geopolitics", the term score for the term "geopolitics" would be 4.0*0=0.0.

Thus, in an example, to compute the document score for the first electronic document 102 the query correlation module 204 searches for each term T of the set S3, counts the number of occurrences of the given term T, multiples the weight of the term T by the number of occurrences to obtain a term score, then sums or otherwise combines the term scores for each term T to compute the document score for the first electronic document 102. For instance, in a simplified process, if the set S3 includes the terms "geopolitics", "econopolitics", and "cyberpolitics", and those terms have term scores of 20.0, 5.5, and 3.0, respectively, then the document score for the first electronic document 102 may be 28.5. The process may be repeated for some or all of the electronic documents 102 to compute separate term scores for each term in set S3 and then combine the term scores to compute a document score for the electronic document 102.

As such, the document scores represent a score for each electronic document 102 relative to a particular query as expanded first to set S1 by the knowledge base expansion module 200, to set S2 by the statistical expansion module 202, and then to S3 by the query correlation module 204. The electronic documents 102 may be ranked according to their document scores and presented on a user interface in response to the query according to their rank. Thus, the electronic document 102 having the highest document score may be presented first in a list or otherwise most prominently, the electronic document 102 having the second highest document score presented second in the list or second most prominently, and so forth. The display of results in response to a query may thus be understood to be in response to a user action or prompt.

The same principles described with respect to the input of a query may also be utilized by the query correlation module 204 to categorize the electronic documents 102 without respect to a use prompt or query input. A user may input or update a list of categories or a list of categories may be based on past queries or otherwise obtained from any of a variety of sources, such as common searches from other platforms. A category is not necessarily limited either in scope or in the number of terms T. A category may thus be relatively broad and/or with one term T (e.g., "politics" or "cooking") or relatively narrow and/or with multiple terms (e.g., "members of United States Congress" or "charcoal grilled steak").

Figure 3:
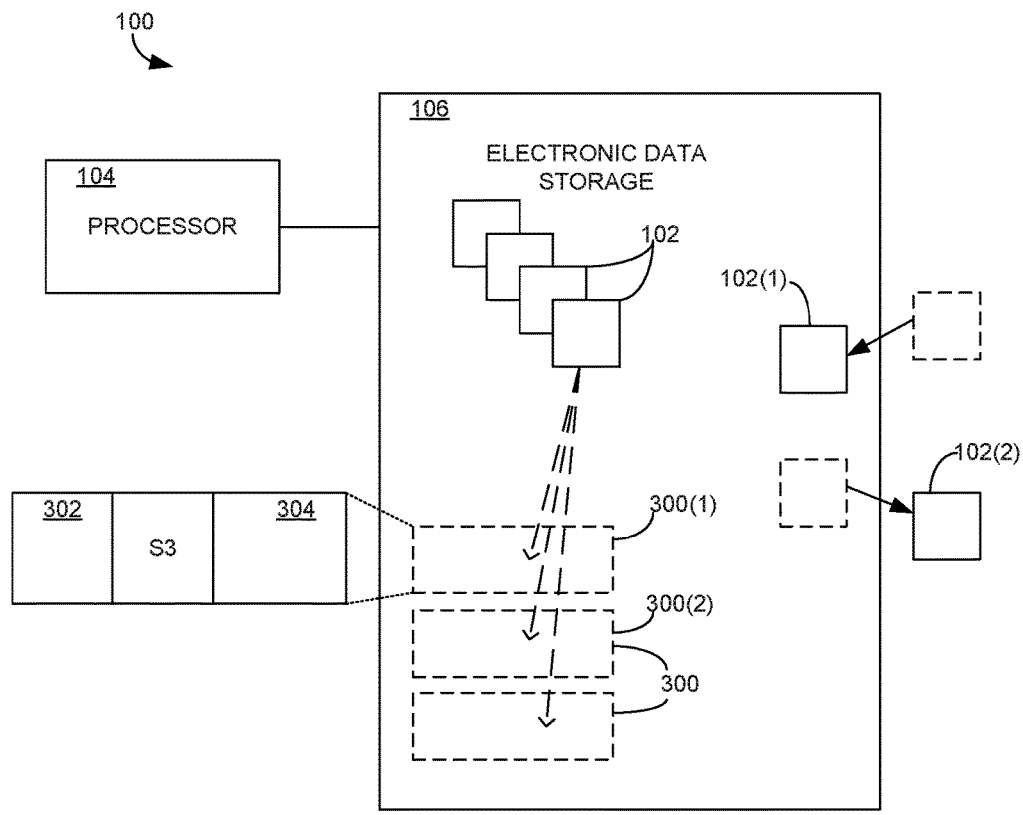
FIG. 3 is an illustration of electronic documents entering and leaving a system, in an example embodiment.

FIG. 3 is an illustration of electronic documents 102 entering and leaving the system 100, in an example embodiment. As disclosed herein, electronic documents 102(1) may enter the system 100 according to any of a variety of ways, including being downloaded from or accessed by sources, such as a network drive, website, or cloud data storage, via a network and by being loaded into the system by direct electronic media, such as optical discs and personal flash memory drives. Incorporation of electronic documents 102 into the system 100 does not necessarily download the electronic document 102 into the system 100 and onto the electronic data storage itself, provided that the system 100 is capable of accessing the electronic document 102 and the information included therein, e.g., via a network or cloud storage access.

Similarly, electronic documents 102(2) may leave the system 100. An electronic document 102(2) may be considered to leave the system 100 when the electronic document 102(2) is deleted from the electronic data storage 106 or otherwise rendered physically or logically inaccessible by the processor 104.

The system 100 may categorize the electronic documents 102 according to the categories 300 as a background process as new categories 300 and/or electronic documents 102(1) are added to the system 100. To categorize electronic documents 102, the system 100 processes the terms T of a category 300 through the knowledge base expansion module 200 and the statistical expansion module 202 to create sets S1 and S2 of expanded terms T and the query correlation module 204 creates set S3, as disclosed herein. The query correlation module 204 then scores each electronic document 102 against set S3, as disclosed herein, and ranks the electronic documents 102. A user may then select or otherwise enter a desired category 300, upon which electronic documents 102 of the category 300 may be displayed to the user. The display may be a predetermined number of the top-ranked electronic documents 102 and/or a list of the electronic documents 102 as ranked.

It is to be understood that the system 100 may store, for each category 300, a category identifier 302 (e.g., "politics") and at least the resultant set S3 of expanded terms T corresponding to that category 300. It is to be understood that the resultant set S3 of expanded terms T may be different for each category 300. The system 100 may also store the ranked list or a list of the predetermined number of top-scored electronic documents 102 for each category 300 in an electronic documents field 304.

Upon an electronic document 102(1) being added to the system 100, the system 100 may incorporate the newly-added electronic document 102(1) into the categories 300 by scoring the document 102(1) against the set S3 of expanded terms T for each category 300 and re-ranking the electronic documents 102 of each category 300 in view of the document scores of the new electronic document 102(1). Thus, if the new electronic document 102(1) has a sufficiently high document score corresponding to the set S3 of a first category 300(1) then the new electronic document 102(1) may be added to the predetermined number of electronic documents 102 for the first category 300(1). By extension, if the electronic document 102(1) does not have a sufficiently high document score corresponding to the set S3 of a second category 300(2), then the electronic document 102(1) may not be added to the predetermined number of electronic documents 102 for the second category 300(2). Thus, for instance, if the new electronic document 102(1) has a document score for the first category 300(1) of 32.5, and the previous highest document score for the first category 300(1) is 28.75, then the new electronic document 102(1) becomes the highest-ranked electronic document 102 of the first category 300(1). Similarly, if the new electronic document 102(1) has a document score for the second category 300(2) of 12.0 and the lowest document score of the predetermined number of electronic documents 102 of the second category 300(2) is 15.0 then the new electronic document 102(1) would not be added to the predetermined number of electronic documents 102 of the second category 300(2). Membership in either or both of the first and second categories 300 may be limited by one or both of an absolute number of permitted electronic documents 102 in the category 300 and/or by a minimum score requirement.

Figure 4:
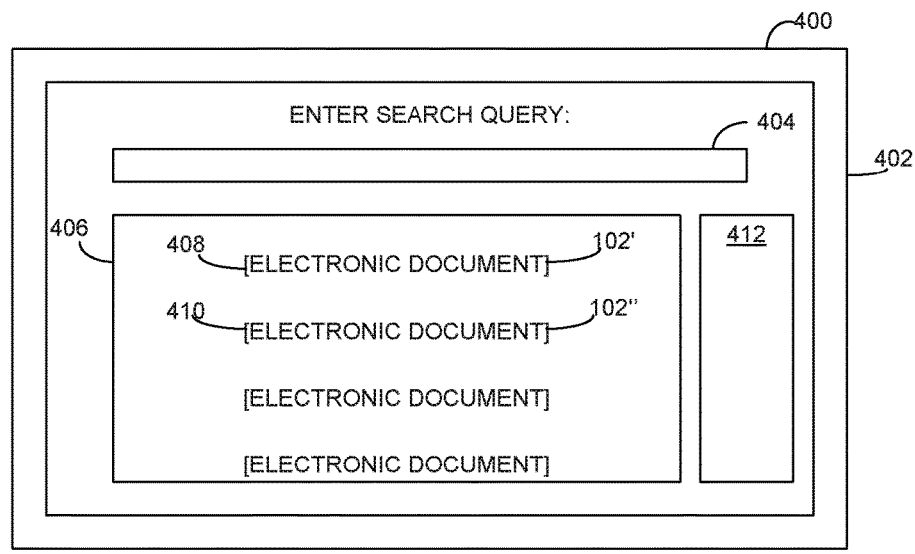
FIG. 4 is a user interface device having a user interface, in an example embodiment.

FIG. 4 is a user interface device 400 having a user interface 402, in an example embodiment. The user interface device 400 may be a component of the system 100 or may access the system 100 and/or be accessed by the system 100 without being a component of the system. The user interface device 400 may be a computing device, such as a personal computer, workstation, tablet computer, smartphone, and the like which include internal processing capabilities or may be a display and/or other user interface component coupled to and controlled directly by the processor 104.

As illustrated, the user interface 402 is a display screen, though the user interface 402 may include any suitable components as desired for accepting input from a user and providing output to a user. Such additional components may include a touchscreen, keyboard, mouse, microphone and/or speaker, and the like.

In the illustrated example, the user interface 402 includes a query field 404 in which a user may enter search terms T of the query. As noted herein, the query may be an original query or may be or may correspond to a category. In the case of the query being an original query the system 100 may then generate the expanded sets S1, S2, S3 as disclosed herein. A query may alternatively be a category either by the intentional selection of a category by a user or by inputting a query that has search terms T that happen to correspond to the search terms T of a category. In such a circumstance, the system 100 may simply apply the previously determined results of the category in lieu of re-generating the expanded sets S1, S2, S3 and so forth.

The user interface 402 further includes a results field 406. The results field 406 as illustrated displays an ordered list providing links 408 to individual electronic documents 102. The individual electronic documents 102 are ordered according to their document scores as determined by the system 100. In such an example, an electronic document 102' having the highest document score is listed in a first position 408, an electronic document 102" having the second highest document score is listed in a second position 410, and so forth. As described herein, the number of positions may be a predetermined number of positions displaying the same predetermined number of the highest-scored electronic documents 102. Alternatively, the results field 406 may display all of the electronic documents 102 ranked according to their document scores. The results field 406 may scroll or allow a user to move between and among individual pages of results.

The user interface 402 may include any additional information or data input as desired. Thus, for instance, metadata for individual electronic documents 102, such as the document score, a document summary and/or text from the electronic document 102, a web address, and related information, among a variety of additional metadata. Further, a category field 412 may allow for some or all of the categories 300 to be displayed, searched, input (e.g., in a text field), modified, or otherwise interacted with. As such, in such an example, the selection of a category 300 may produce in the results field 406 the electronic documents 102 as ranked as if the category 300 or the search terms T of the category 300 had been entered as a query in the query field 404.

Figure 5:
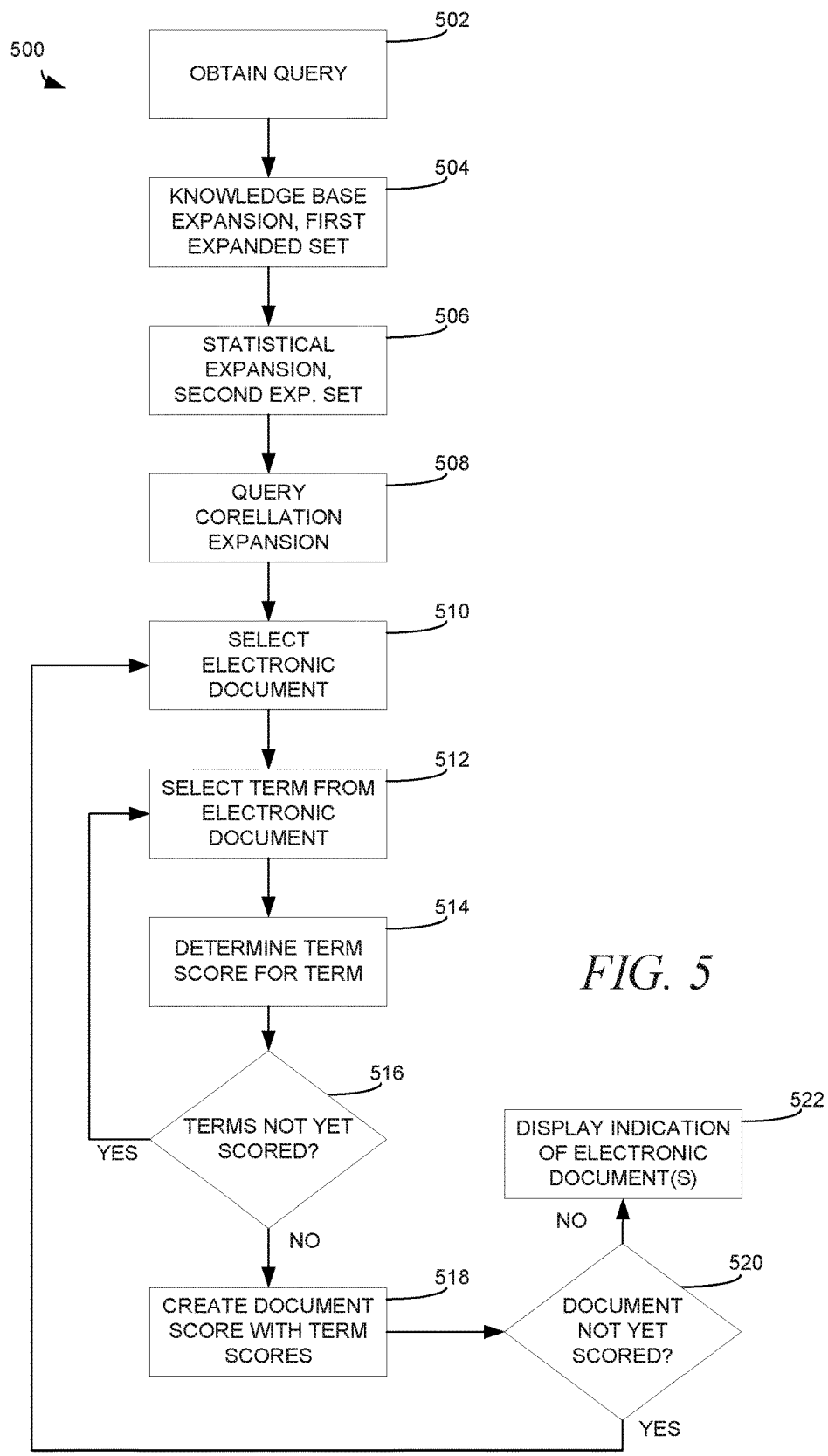
FIG. 5 is a flowchart for generating a document score for an electronic document, in an example embodiment.

FIG. 5 is a flowchart 500 for generating a document score for an electronic document 102, in an example embodiment. The flowchart 500 will be described with respect to the system 100 and other devices and/or systems disclosed herein. However, it is to be recognized and understood that the operations of the flowchart 500 are not limited to the system 100 and that the operations may be performed by any suitable system or device.

At 502, a query is obtained via the user interface 402. The query may be entered by the user via the query field 404 or selected from categories 300 in the category field 412. If entered by the user in the query field 404, such as in a text string, the query may be an original query or correspond to and implemented as a category 300.

At 504, the processor 104 and/or the knowledge base module 200 generates, for at least one search term T of the query, and in various examples all of the search terms T of the query, a first expanded set S1 of search terms based, at least in part, on at least one related word obtained from a knowledge base of the at least one search term. In an example, the knowledge base is a thesaurus, but any suitable source of synonyms or other relationships between and among words may be utilized.

At 506, the processor 104 and/or the statistical expansion module 202 generates a second expanded set S2 of search terms T by applying a statistical model to the search terms T of the first expanded set S1 based on terms, such as words and character strings, included in a corpus of electronic documents 102 stored in an electronic data storage 106. In an example, the statistical model is the LSI statistical model, though any suitable statistical model may be utilized.

At 508, the processor 104 and/or the query correlation module 204 generates a third expanded set S3 of search terms T based on the first expanded set S1 and the second expanded set S2. In various examples, the search terms T may be identified according to any suitable method, including by taking the mathematical union of the first and second expanded sets S1, S2.

At 510, the processor 104 and/or the query correlation module 204 selects an electronic document 102 of the corpus of electronic documents 102 for which a document score has not been obtained for the query.

At 512, the processor 104 and/or the query correlation module 204 selects a term Ti of the terms T of the electronic document 102 selected at 510 for which a term score has not been determined. Alternatively, the processor 104 and/or the query correlation module 204 selects a term Ti of the terms T of the third expanded set S3 for which a term score has not been determined for the electronic document selected at 510. In various examples, a term T may be ineligible to have a term score calculated if the term T does not meet one or more conditions described herein, such as by not having a sufficiently high weight. In such an example, only the eligible search terms are selected for determining a term score.

At 514, the processor 104 and/or the query correlation module 204 determines the term score for the term Ti selected at 512 relative to the set S3 as disclosed herein.

At 516, the processor 104 and/or the query correlation module 204 determines if any terms T of the electronic document 102 selected at 510 have not had term scores calculated. Alternatively, the processor 104 and/or the query correlation module 204 determines if any terms T of the third expanded set S3 have not had term scores calculated for the electronic document selected at 510. In both cases, if so, the processor 104 and/or the query correlation module 204 proceeds to 512. If not, the processor 104 and/or the query correlation module 204 proceeds to 518.

At 518, the processor 104 and/or the query correlation module 204 combine the term scores for the electronic document 102 selected at 510 to create a document score for that electronic document 102. Combining the term scores may be according to any suitable method, including by adding the term scores together.

At 520, the processor 104 and/or the query correlation module 204 determines if any electronic documents 102 of the corpus of electronic documents 102 does not have a document score. If so, the processor 104 and/or the query correlation module 204 proceeds to 510. If not, the processor 104 and/or the query correlation module 204 proceeds to 522.

At 522, the processor 104 causes the user interface 402 to display an indication of one or more of the electronic documents 102. The indication may be the display of the links 406 to the electronic documents 102 as illustrated with respect to the user interface 402. Additionally or alternatively, the indication may be the electronic documents 102 themselves may be displayed on the use interface 402 in addition to or instead of the links 406.

Figure 6:
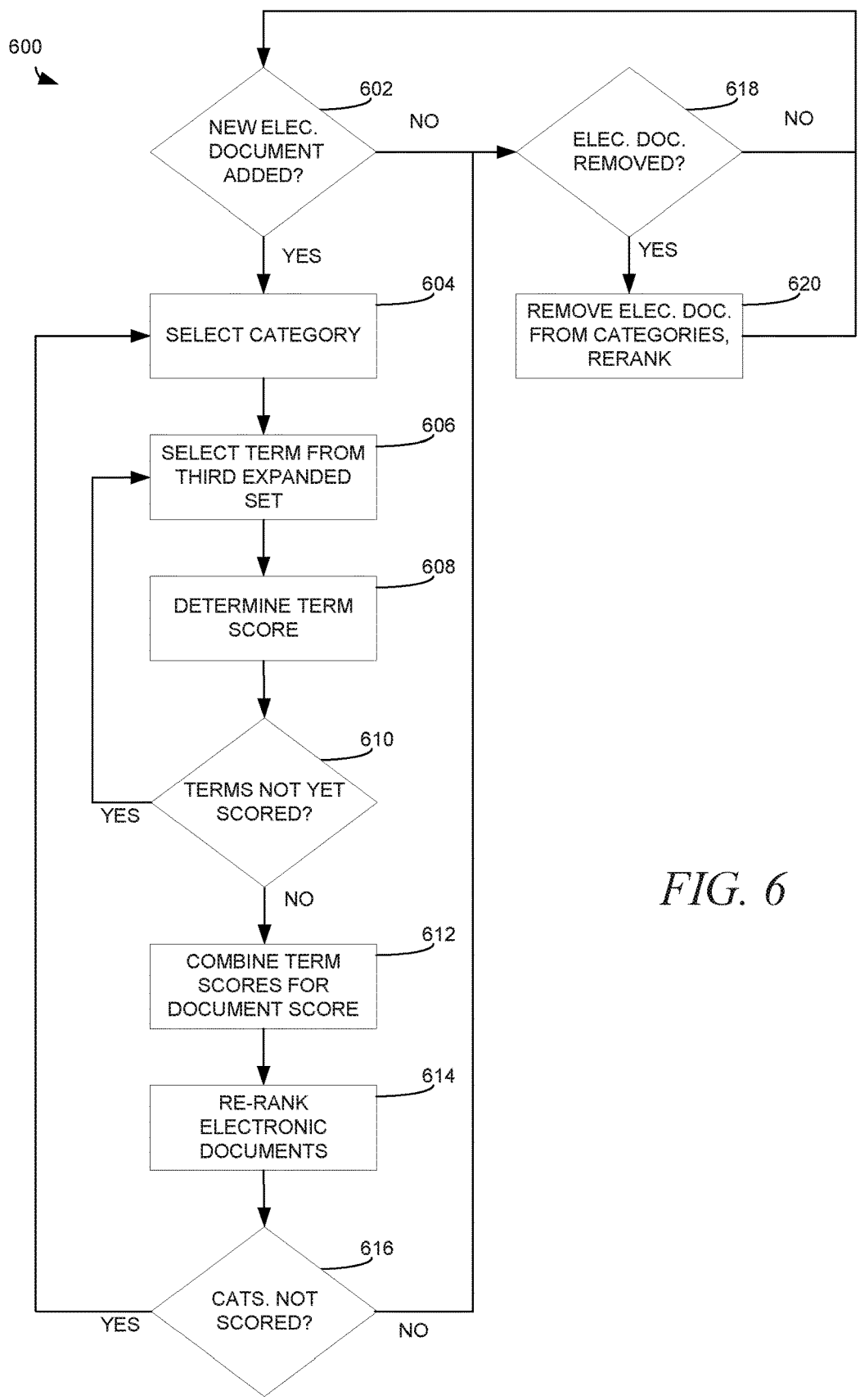
FIG. 6 is a flowchart for adding and removing electronic documents from a system, in an example embodiment.

FIG. 6 is a flowchart for adding and removing electronic documents 102 from the system 100, in an example embodiment. The flowchart 600 will be described with respect to the system 100 and other devices and/or systems disclosed herein. However, it is to be recognized and understood that the operations of the flowchart 600 are not limited to the system 100 and that the operations may be performed by any suitable system or device.

At 602, the processor 104 determines if a new electronic document 102(1) has been added to the system 100. If so, the processor 104 proceeds to 604. If not, the processor 104 proceeds to 618.

At 604, the processor 104 selects a category 300 for which the electronic document 102(1) has not received a document score.

At 606, the processor 104 and/or the query correlation module 204 selects a term Ti of the terms T of the electronic document 102 of the category for which a term score has not been determined. Alternatively, the processor 104 and/or the query correlation module 204 selects a term Ti of the terms of the third expanded set S3 of the category for which a term score has not been determined for the electronic document 102(1). In various examples, the third expanded set S3 will have been previously determined for the category and does not need to be determined as in the flowchart 500.

At 608, the processor 104 and/or the query correlation module 204 determines the term score for the term Ti selected at 606 as disclosed herein.

At 610, the processor 104 and/or the query correlation module 204 determines if any terms T of the third expanded set S3 have not had term scores calculated for the electronic document 102(1). If so, the processor 104 and/or the query correlation module 204 proceeds to 606. If not, the processor 104 and/or the query correlation module 204 proceeds to 612.

At 612, the processor 104 and/or the query correlation module 204 combine the term scores for the electronic document 102(1) to create a document score for the electronic document 102(1). Combining the term scores may be according to any suitable method, including by adding the term scores together.

At 614, the processor 104 and/or the query correlation module 204 re-rank the electronic documents 102 in the category 300 as needed based on their respective document scores for the category 300 in view of the document score of the electronic document 102(1).

At 616, the processor 104 and/or the query correlation module 204 determine if there are any categories 300 for which the electronic document 102(1) has not had a document score determined. If so, the processor 104 and/or the query correlation module 204 proceed to 604. If not, the processor 104 and/or the query correlation module 204 proceed to 618.

At 618, the processor 104 determines if an electronic document 102(2) has been removed from the corpus of electronic documents 102. If so, the processor 104 proceeds to 620. If not, the processor 104 proceeds to 602.

At 620, the processor 104 removes the electronic document 102(2) from the categories 300 and re-orders the electronic documents 102 remaining in each categories 300 according to their existing document scores.

Figure 7:
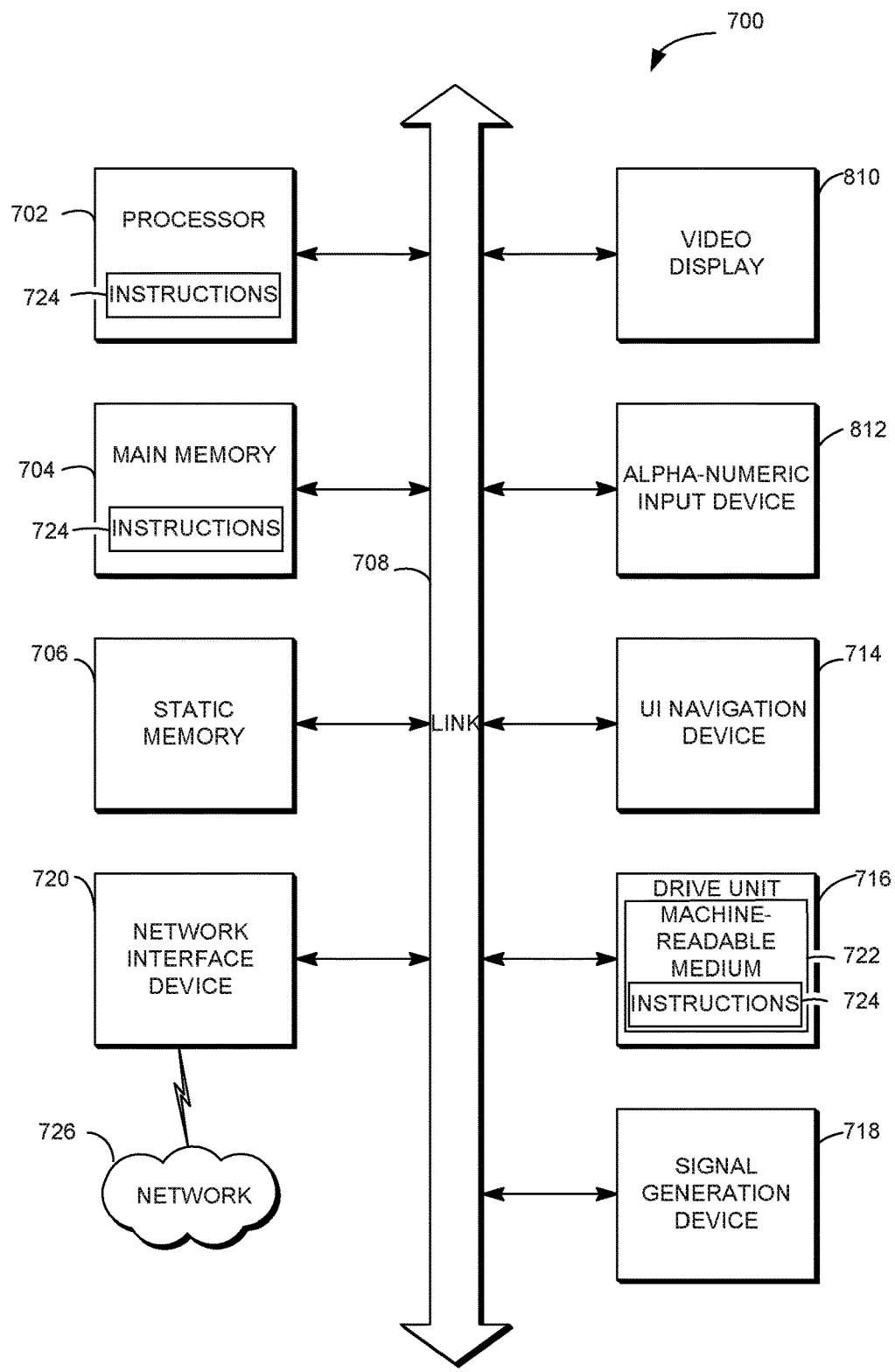
FIG. 7 is a block diagram illustrating components of a machine able to read instructions from a machine readable medium.

FIG. 7 is a block diagram illustrating components of a machine 700, according to some examples, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system within which instructions 724 (e.g., software) for causing the machine 700 to perform any one or more of the methodologies discussed herein may be executed. In alternative examples, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method for identifying relevant documents within a document corpus, comprising:
   applying, by a processor, at least one search term of a query to a knowledge base to expand the at least one search term into a first expanded set of search terms, wherein
      the knowledge base comprises
         a plurality of paired terms sharing relationships, and
         for each paired term of the plurality of paired terms, an identification of a respective type of relationship, and
      applying the at least one search term of the query to the knowledge base comprises identifying, for each term of the at least one search term, one or more matching shared terms to the respective term in of the plurality of paired terms in the knowledge base, determining, based on the respective type of relationship of each paired term of the one or more paired terms, a relative strength of relationship between the respective term and each term of the one or more matching shared terms, and adding a portion of the one or more matching shared terms to the first expanded set of search terms;

generating, by the processor, a second expanded set of search terms by applying a statistical model to each search term of the at least one search term, wherein the statistical model is developed from a plurality of terms included in the electronic document corpus, and the statistical model is stored in an electronic data storage;

generating, by the processor, a third expanded set of search terms comprising a portion of the search terms in the first expanded set and a portion of the search terms in the second expanded set;

for each search term of the third expanded set, determining, with the processor, a term score for each electronic document of a plurality of electronic documents of the document corpus, wherein the respective term score is based on occurrence of the respective search term in the respective electronic document of the document corpus;

for each electronic document of the plurality of electronic documents, combining, by the processor, the respective term scores to create a document score for the respective electronic document; and causing, by the processor, a user interface to display an indication of at least one relevant electronic document of the plurality of electronic documents based on the query and the respective document score of each document of the at least one relevant electronic document.

2. The method of claim 1, wherein:

applying the at least one search term of the query to the knowledge base comprises identifying, for each of the matching shared terms, a secondary matching shared term to the respective matching shared term in one or more of the plurality of paired terms in the knowledge base; and determining the relative strength of relationship between the respective term and each matching shared term of the one or more matching shared terms further comprises determining the relative strength of relationship based on a number of times one of the secondary matching shared terms of the matching shared terms is the respective matching shared term.

3. The method of claim 2, wherein:

applying the at least one search term of the query to the knowledge base comprises identifying, for each of the secondary matching shared terms, a tertiary matching shared term to the respective secondary matching shared term in one or more of the plurality of paired terms in the knowledge base; and determining the relative strength of relationship between the respective term and each matching shared term of the one or more matching shared terms further comprises determining the relative strength of relationship based on a number of times one of the tertiary matching shared terms of the secondary matching shared terms is the respective matching shared term.

4. The method of claim 1, wherein determining the relative strength of relationship between the respective term and each term of the one or more matching shared terms comprises determining a weight associated with paired terms of the respective term and each term of the one or more matching shared terms.

5. The method of claim 4, wherein generating the third expansion set comprises applying a minimum weight to each of the search terms in the first expanded set to select the portion of the search terms of the first expanded set.

6. The method of claim 4, wherein:

each paired term of the plurality of paired terms comprises a designated first term and a designated second term; and determining the relative strength of relationship between the respective term and each term of the one or more matching shared terms comprises applying a weight to the paired terms of the respective term and the matching term based on whether the respective term is the designated first term or the designated second term.

7. The method of claim 1, wherein:

applying the at least one search term of the query to the knowledge base comprises identifying, for each of the matching shared terms, a secondary matching shared term to the respective matching shared term in one or more of the plurality of paired terms in the knowledge base; and applying the at least one search term of the query to the knowledge base comprises adding one or more of the secondary matching shared terms based on a threshold number of times a respective secondary matching shared term of the one or more secondary matching shared terms is identified within the secondary matching shared terms.

8. A non-transitory computer readable medium, comprising instructions which, when implemented by a processor, cause the processor to perform operations for identifying relevant documents within a document corpus, the operations comprising:

applying at least one search term of a query to a knowledge base to expand the at least one search term into a first expanded set of search terms, wherein the knowledge base comprises a plurality of paired terms sharing relationships, and for each paired term of the plurality of paired terms, an identification of a respective type of relationship, and applying the at least one search term of the query to the knowledge base comprises identifying, for each term of the at least one search term, one or more matching shared terms to the respective term in of the plurality of paired terms in the knowledge base, determining, based on the respective type of relationship of each paired term of the one or more paired terms, a relative strength of relationship between the respective term and each term of the one or more matching shared terms, and adding a portion of the one or more matching shared terms to the first expanded set of search terms;

generating a second expanded set of search terms by applying a statistical model to each search term of the at least one search term, wherein the statistical model is developed from a plurality of terms included in the electronic document corpus, and the statistical model is stored in an electronic data storage;

generating a third expanded set of search terms comprising a portion of the search terms in the first expanded set and a portion of the search terms in the second expanded set;

for each search term of the third expanded set, determining, with the processor, a term score for each electronic document of a plurality of electronic documents of the document corpus, wherein the respective term score is based on occurrence of the respective search term in the respective electronic document of the document corpus;

for each electronic document of the plurality of electronic documents, combining the respective term scores to create a document score for the respective electronic document; and causing a user interface to display an indication of at least one relevant electronic document based on the query and the respective document score of each document of the at least one relevant electronic document.

9. The non-transitory computer readable medium of claim 8, wherein:
the query corresponds to a document category; and
the instructions cause the processor to perform operations further comprising
categorizing the plurality of electronic documents according to the document category based on the document score for each of the plurality of electronic documents individually; and
storing, in the electronic data storage, an indication of a portion of the plurality of electronic documents as categorized according to the document category.

10. The computer readable medium of claim 9, wherein the determining the term score comprises determining the term score responsive to a new electronic document being newly incorporated into the plurality of electronic documents.

11. The computer readable medium of claim 9, wherein the instructions cause the processor to perform operations further comprising updating the second set of expanded search terms and the third set of expanded search terms upon one of a) a second electronic document being newly incorporated into the plurality of electronic documents, and b) the second electronic document being removed from the plurality of electronic documents.

12. The computer readable medium of claim 9, wherein:
the category is one of a plurality of categories; and
each of the plurality of electronic documents is categorized with respect to at least one of the plurality of categories.

13. The computer readable medium of claim 8, wherein the instructions cause the processor to perform further operations comprising:
obtaining, via the user interface, the query;
wherein determining the first, second, and third expanded sets, determining the term scores, combining the term scores, and causing the user interface to display the indication occur upon receipt of the query.

14. The computer readable medium of claim 8, wherein the knowledge base comprises a thesaurus.

15. A system for organizing a plurality of documents within a document corpus, the system comprising:
a network interface;
a non-transitory computer readable media comprising a knowledge base;
a non-transitory electronic data storage comprising a plurality of electronic documents of a document corpus; and
a processor configured to
access a plurality of categories, wherein each category of the plurality of categories comprises at least one search term,
for each category of the plurality of categories,
apply each search term of at least one search term of the respective category to a knowledge base to expand the at least one search term into an expanded set of search terms, wherein
the knowledge base comprises
a plurality of paired terms sharing relationships, and
for each paired term of the plurality of paired terms, an identification of a respective type of relationship, and
applying the at least one search term of the respective category to the knowledge base comprises
identifying, for each term of the at least one search term, one or more matching shared terms to the respective term in of the plurality of paired terms in the knowledge base,
determining, based on the respective type of relationship of each paired term of the one or more paired terms, a relative strength of relationship between the respective term and the one or more matching shared terms, and
adding a portion of the matching shared terms to the expanded set of search terms, and
add the expanded set of search terms to the respective category,
after adding the respective expanded set of search terms to each respective category of the plurality of categories,
for each electronic document of the plurality of electronic documents of the document corpus and for each category of the plurality of categories, determine a respective document score, wherein determining the respective document score comprises
determining a term score for each search term in the expanded set of search terms based on occurrence of the respective search term in the respective electronic document, and
combining the term scores to create a document score for the respective electronic document, and
storing the term scores of the plurality of electronic documents in the non-transitory electronic data storage.

16. The system of claim 15, wherein the processor is configured to:
receive a query; and
add the query as a new category of the plurality of categories.

17. The system of claim 15, wherein the processor is configured to calculate, for each category of the plurality of categories, a respective category score for each of the plurality of electronic documents from the respective expanded set of search terms for each category of the plurality of categories.

18. The system of claim 17, wherein the processor is configured to:

receive, through a user interface, a category identifier corresponding to a particular category of the plurality of categories; and provide, to the user interface, a portion of the plurality of electronic documents based upon a relative score of each of the plurality of electronic documents in the particular category.

19. The system of claim 17, wherein the processor is configured to rank, for each category of the plurality of categories, the plurality of electronic documents in the document corpus according to the respective category score.

20. The system of claim 19, wherein the processor is configured to:

receive a new document for addition to the document corpus;

access, from the non-transitory electronic data storage, the expanded set of search terms for each category of the plurality of categories;

calculate, for the new document, a category score for each category of the plurality of categories from the respective expanded set of search terms, and re-rank the plurality of electronic documents in the document corpus according to the respective category score, wherein the plurality of electronic documents incorporates the new document.

21. The system of claim 19, wherein the processor is configured to:

detect removal of a document from the document corpus;

remove the removed document from each of the plurality of categories; and re-rank the respective documents in each of the plurality of categories according to the respective category scores.

22. The system of claim 15, wherein the processor is configured to:

generate a second expanded set of search terms by applying a statistical model to each search term of the at least one search term, wherein the statistical model is developed from a plurality of terms included in the electronic document corpus, and the statistical model is stored in the non-transitory electronic data storage; and generate a third expanded set of search terms comprising a portion of the search terms in the first expanded set and a portion of the search terms in the second expanded set.

* * * * *